US012681784B2

(12) United States Patent
Bhagavathiperumal et al.

(10) Patent No.: US 12,681,784 B2
(45) Date of Patent: Jul. 14, 2026

(54) SYSTEMS AND METHODS FOR MEASURING LATENCY ACROSS MICROSERVICES

(71) Applicant: Aviz Networks, Inc., San Jose, CA (US)

(72) Inventors: Chidambaram Bhagavathiperumal, Livermore, CA (US); Madhu Paluru, Fremont, CA (US); Sutharsan Srinivasan, Chennai (IN); Harrish Subramaniam Jeyabalu, Chennai (IN)

(73) Assignee: Aviz Networks, Inc., San Jose, CA (US)

( * ) Notice: Subject to any disclaimer, the term of this patent is extended or adjusted under 35 U.S.C. 154(b) by 751 days.

(21) Appl. No.: 18/095,140

(22) Filed: Jan. 10, 2023

(65) Prior Publication Data

US 2024/0231971 A1     Jul. 11, 2024

(51) Int. Cl.
*G06F 9/54*          (2006.01)

(52) U.S. Cl.
CPC .............. *G06F 9/547* (2013.01); *G06F 9/542* (2013.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | |
|---|---|---|---|
| 11,671,484 B2 * | 6/2023 | Campbell | ........... H04L 67/1008 709/224 |
| 2006/0168070 A1 * | 7/2006 | Thompson | .......... H04L 41/0806 709/206 |
| 2021/0385290 A1 * | 12/2021 | Edamadaka | ......... G06Q 10/103 |

* cited by examiner

*Primary Examiner* — Andy Ho
(74) *Attorney, Agent, or Firm* — Select IP Law Corporation; Ashkon Cyrus

(57)          ABSTRACT

A system and method for measuring latency is disclosed. In some implementations, the processor may include providing a switch API to process a plurality of microservices involved in a workflow and connected to a distributed in-memory keyvalue database, where the distributed in-memory key-value database further may include a plurality of key spaces. In addition, the processor may include managing configuration tools to track the latency of each microservice in the plurality of microservices. The processor may include programing data plane information of the microservices to create programmed data, where programming further may include collecting and analyzing data on the latency of each microservice of the plurality of microservices. Moreover, the processor may include feeding the programmed data into an ASIC.

12 Claims, 6 Drawing Sheets

External/Internal Event

400

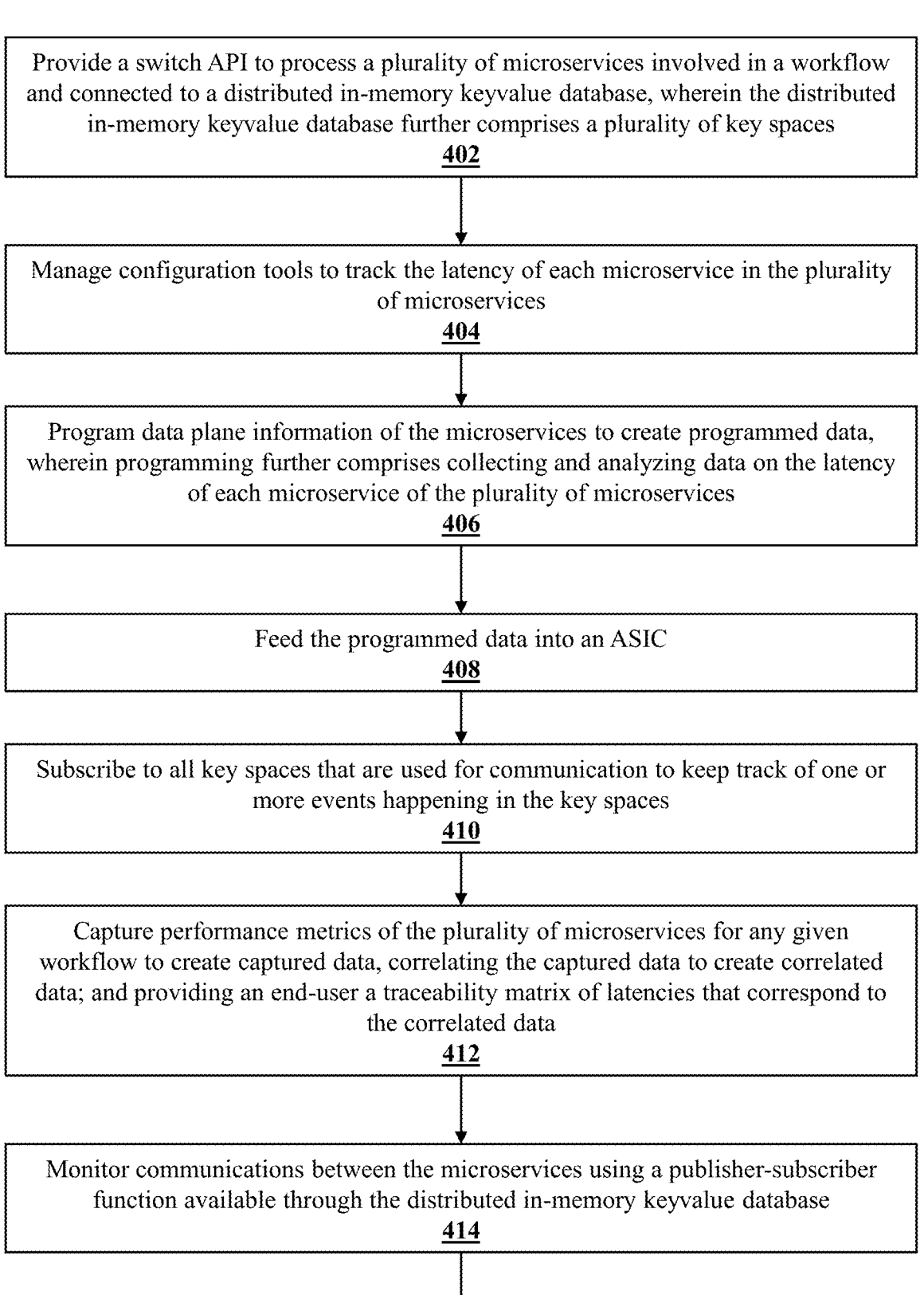

Provide a switch API to process a plurality of microservices involved in a workflow and connected to a distributed in-memory keyvalue database, wherein the distributed in-memory keyvalue database further comprises a plurality of key spaces
402

Manage configuration tools to track the latency of each microservice in the plurality of microservices
404

Program data plane information of the microservices to create programmed data, wherein programming further comprises collecting and analyzing data on the latency of each microservice of the plurality of microservices
406

Feed the programmed data into an ASIC
408

Subscribe to all key spaces that are used for communication to keep track of one or more events happening in the key spaces
410

Capture performance metrics of the plurality of microservices for any given workflow to create captured data, correlating the captured data to create correlated data; and providing an end-user a traceability matrix of latencies that correspond to the correlated data
412

Monitor communications between the microservices using a publisher-subscriber function available through the distributed in-memory keyvalue database
414

FIG. 4A        FIG. 4B execute a new micro service perform a targeted computation
416 notify the plurality of microservices that need to respond by terms of subscription to this channel-keyspace, wherein each input to the microservice will provide an output in the distributed in-memory keyvalue database that which can be consumed by other micro services
418

500

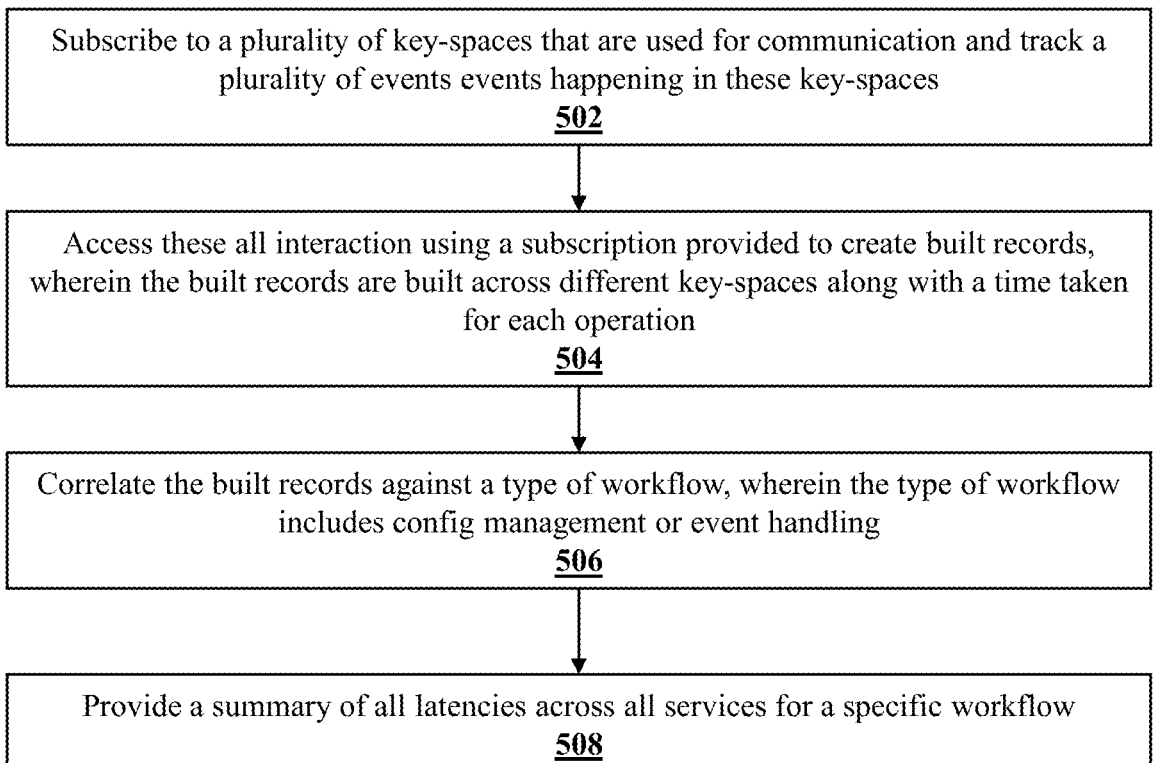

Subscribe to a plurality of key-spaces that are used for communication and track a plurality of events events happening in these key-spaces
502

Access these all interaction using a subscription provided to create built records, wherein the built records are built across different key-spaces along with a time taken for each operation
504

Correlate the built records against a type of workflow, wherein the type of workflow includes config management or event handling
506

Provide a summary of all latencies across all services for a specific workflow
508

FIG. 5

SYSTEMS AND METHODS FOR MEASURING LATENCY ACROSS MICROSERVICES

BACKGROUND

Microservice based architectures are increasingly coming into use for various applications due to the numerous advantages that they provide. However, this increasing number of microservices has also come with an additional cost in the form of an increase in the latency in the application. As these additional microservices are involved in a workflow then additional interactions and communication become necessary between those services. Each additional interaction requires time for the request to be sent and the response to be received, which can result in increased latency and slow down the processing time. Moreover, as the number of microservices increases it can become more difficult to manage and maintain these services.

These latency and management problems become even more amplified if there are issues with any of the microservices (such as bugs, poor performance, or unavailability), as these negative issues can further impact the overall latency of the system. To mitigate the impact of increased latency, it is important for organizations to carefully plan and manage their microservice architecture and regularly monitor and optimize the performance of their systems. High latency can negatively impact the user experience, as it can result in slower response times and reduced productivity. High latency can also lead to increased costs, as it may require more resources to handle the increased workload.

Thus, there is a need for improved methods to regularly monitor and measure latency across microservices, such that organizations can identify and address any issues in a timely manner which can help to optimize the performance of their systems and improve the overall efficiency and effectiveness of their operations.

SUMMARY

Regularly monitoring and measuring latency across microservices can help organizations unlock the performance of their systems and identify any bottlenecks or inefficiencies in their workflow. Embodiments of the present disclosure provide systems and method for monitoring and measuring latency across microservices. In some disclosed embodiments, a computing system interacts with a network operating system further comprising a distributed database such as Cisco IOS, Juniper JUNO, Software for Open Networking in the Cloud (SONiC), or other Linux-based networking operating system. The systems described herein may utilize Linux-based networking operating systems for core functionality such as networking, process management, and memory management. The systems described herein may further include a set of modular software components that implement a set of networking protocols and functions, such as routing, switching, and link aggregation. These components can be plugged into the framework and dynamically loaded or unloaded as needed.

A system of one or more computers can be configured to interact with a microservice based architecture by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions.

According to an embodiment, various components interact with each other directly or indirectly in a microservice based architecture. According to an embodiment, any configuration or event occurring in the system is configured to percolate across multiple microservices before resulting in an end-result. According to a further embodiment, events are traced and used to understand system behavior under operating conditions. Various methods to provide analytics of the system are disclosed. In an additional embodiment, the system tracks the amount of time a request was pending with each of the microservices.

According to an embodiment of the present disclosure a method monitors the communication between the microservices utilizing a publisher-subscriber function in connection with a distributed in-memory key-value database infrastructure. In one general aspect, a method of measuring latency may include providing a switch API to process a plurality of microservices involved in a workflow and connected to a distributed in-memory keyvalue database, where the distributed in-memory keyvalue database further may include a plurality of key spaces.

The method may also include managing configuration tools to track the latency of each microservice in the plurality of microservices. The method may furthermore include programing data plane information of the microservices to create programmed data, where programming further may include collecting and analyzing data on the latency of each microservice of the plurality of microservices. The method may in addition include feeding the programmed data into an ASIC. Other embodiments of this aspect include corresponding computer systems, apparatus, and computer programs recorded on one or more computer storage processors, each configured to perform the actions of the methods.

Implementations may include one or more of the following features. The method may also include subscribing to all key spaces that are used for communication to keep track of one or more events happening in the key spaces. The method may also include capturing performance metrics of the plurality of microservices for any given workflow to create captured data, correlating the captured data to create correlated data; and providing an end-user a traceability matrix of latencies that correspond to the correlated data. The method may also include monitoring communications between the microservices using a publisher-subscriber function available through the distributed in-memory keyvalue database. The method may include executing a new micro service perform a targeted computation. The method may include publishing required data in the distributed in-memory key-value database; and notifying the plurality of microservices that need to respond by terms of subscription to a designated channel-keyspace, where each input to the microservice will provide an output in the distributed in-memory keyvalue database that which can be consumed by other micro services. Implementations of the described techniques may include hardware, a method or process, or a computer tangible medium.

A system is also disclosed that includes a switch API configured to process a plurality of microservices involved in a workflow and connected to a distributed in-memory keyvalue database, where the distributed in-memory keyvalue database further may include a plurality of key spaces. The system may furthermore include configuration tools to track the latency of each microservice in the plurality of microservices. The system may in addition include a processor that uses data plane information of the microservices to create programmed data, where programming further may include collecting and analyzing data on the latency of each microservice of the plurality of microservices. The system may moreover include feeding the programmed data into an ASIC. Other embodiments of this aspect include corresponding computer systems, apparatus, and computer programs recorded on one or more computer storage processors, each configured to perform the actions of the methods.

Implementations may include one or more of the following features. A system where the one or more processors are further configured to: subscribe to all key spaces that are used for communication to keep track of one or more events happening in the key spaces. A system where the one or more processors are further configured to: capture performance metrics of the plurality of microservices for any given workflow to create captured data, correlating the captured data to create correlated data; and provide an end-user a traceability matrix of latencies that correspond to the correlated data. A system where the one or more processors are further configured to: monitor communications between the microservices using a publisher-subscriber function available through the distributed in-memory key-value database. A system where the one or more processors are further configured to: execute a new micro service perform a targeted computation. A system where the one or more processors are further configured to: publish required data in the distributed in-memory keyvalue database; and notify the plurality of microservices that need to respond by terms of subscription to a designated channel-keyspace, where each input to the microservice will provide an output in the distributed in-memory keyvalue database that which can be consumed by other micro services. Implementations of the described techniques may include hardware, a method or process, or a computer tangible medium.

BRIEF DESCRIPTION OF THE DRAWINGS

FIGS. 4A and 4B (together, FIG. 4) show a flowchart of a process according to an embodiment of the present disclosure.

FIG. 5 is a flowchart of a process according to an embodiment of the present disclosure.

DETAILED DESCRIPTION

According to embodiments of the present invention, various components interact with each other directly or indirectly in a microservice based architecture, and systems and methods to measure latency are provided. In the embodiments described herein, software applications may decouple network software from the underlying hardware. According to an embodiment the present invention is configured to implement a switch abstraction interface API that runs on network switches and ASICs from multiple vendors.

The present disclosure utilizes a distributed in-memory key-value database infrastructure that further comprises a plurality of key spaces. A key space is defined herein as a data store is an object that holds together all column families of a design. According to an embodiment of the present disclosure, there is one key space per application. According to a further embodiment, all the key-spaces that are used for communication are subscribed by the method to keep track of the events happening in these key-spaces. Each of the updates to the microservice happens through an in-memory data structure store. According to an embodiment, a next step is accessing interactions using the key provided across the data bases to build a snapshot record. Once the snapshot record is built across different key-spaces along with the time taken for each operation, the next step is to correlate against the type of workflow (config management or event handling) and provide the summary of all latencies across all the services in the system for the specific workflow. It can be appreciated that this allows engineers to optimize the necessary services for a given workflow.

Perhaps most importantly, the disclosed techniques reduce the cost of regularly monitoring and measuring latency across microservices considerably. This can make it easier to update and maintain the application, as well as allowing for more flexible scaling and deployment.

System Description

Figure 1:
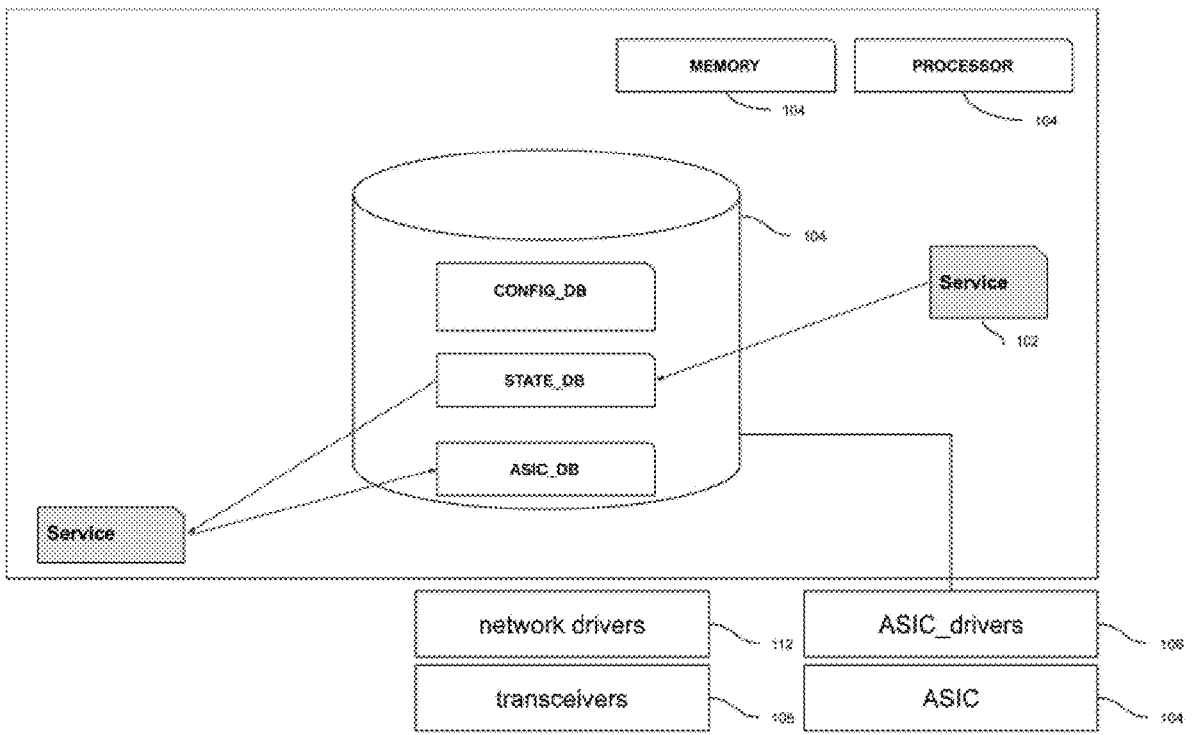
FIG. 1 shows a system architecture according to an embodiment of the present disclosure.

FIG. 1 shows a system architecture according to an embodiment of the present disclosure. System 100 comprises multiple microservices 102 that communicate with one another over a via a distributed database 104, in the present example no-SQL database. Microservices 102 may communicate with distributed database in accordance with any suitable network communication protocol, such as Ethernet, and Microservices 102 may be collocated or located in multiple geographical locations. In such a setup, if there is a delay in processing of the workflow in one the services, it will impact the overall performance of the system. Therefore the methods of the present disclosure specifically identify which services are affecting the overall performance of the system.

According to an embodiment, the infrastructure incorporates a publisher/subscriber function so that applications can subscribe only to the data views that they require, thus avoiding any implementation details that are not relevant to their functionality.

Figure 2:
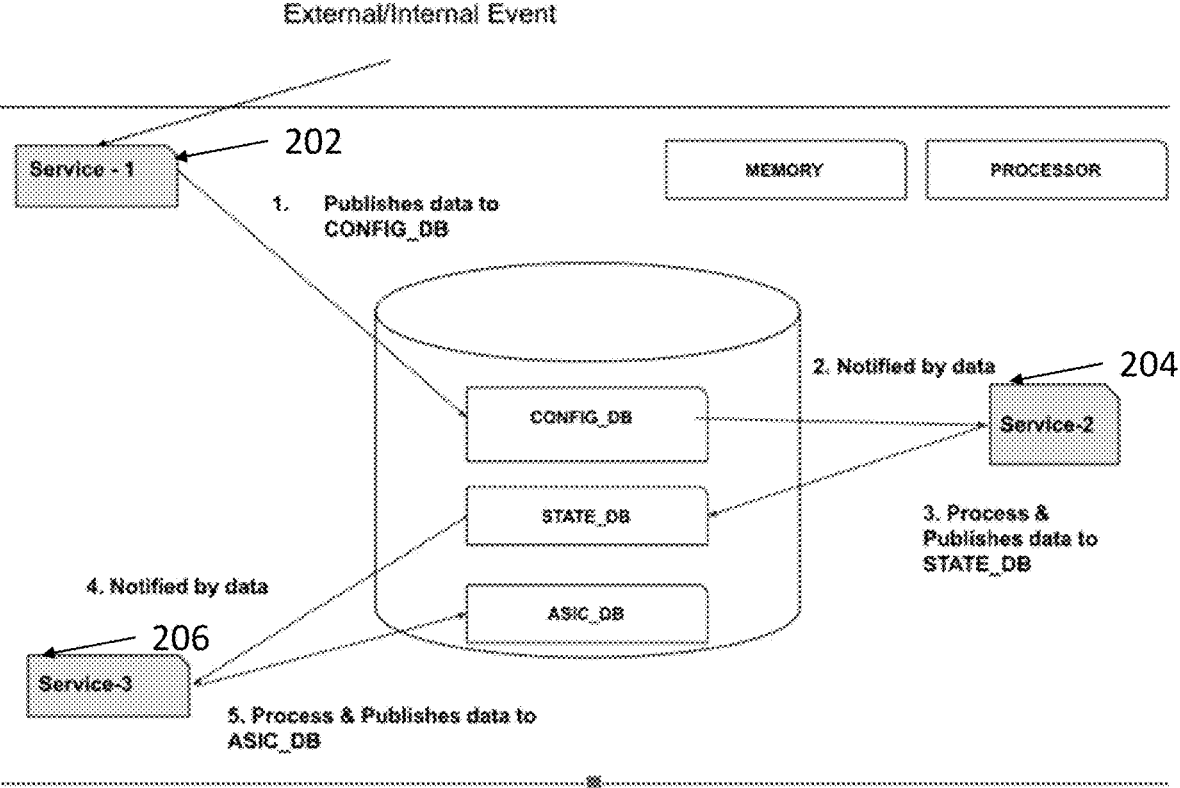
FIG. 2 shows a process flow of services interacting according to an embodiment of the present disclosure.
Figure 3:
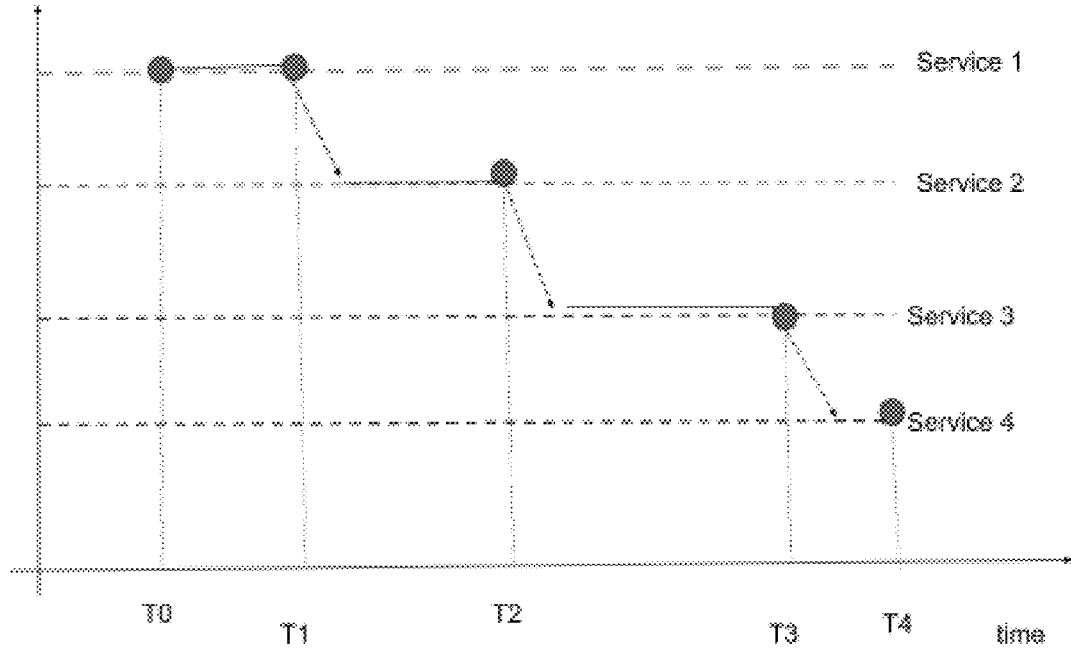
FIG. 3 shows a time representation of services latency.

FIG. 2 shows a process flow of services interacting according to an embodiment of the present disclosure. FIG. 2 shows three separate databases: CONFIG_DB, STATE_DB, and ASIC_DB. According to an embodiment, services can either be internal or external events. In this process flow, first service 202 publishes data to CONFIG_DB. Then, service 204 is notified by data and processes and publishes data to STATE_DB. Service 206 is notified by data and processes and publishes data to ASIC_DB FIG. 3 shows a time representation of services latency.

Figure 4B:
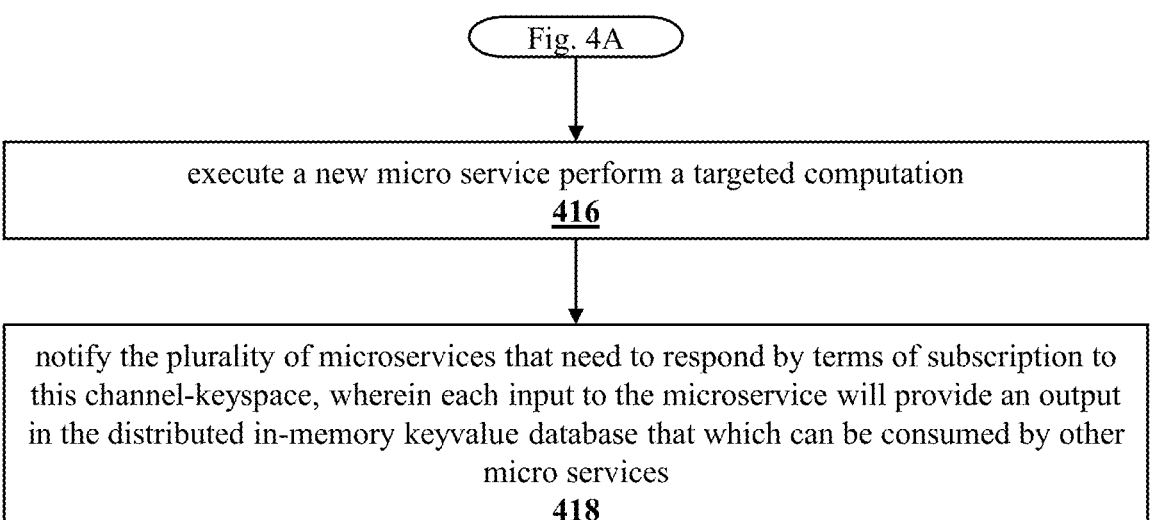

FIGS. 4A and 4B (together, FIG. 4) show a flowchart of a process 400 for measuring latency in the system according to an embodiment of the present disclosure. In some implementations, one or more process blocks of FIG. 4 may be performed by a processor.

As shown in FIGS. 4A and 4B (together, FIG. 4), a process for measuring latency 400 may include providing a switch API to process a plurality of microservices involved in a workflow and connected to a distributed in-memory keyvalue database (block 402). For example, the processor may provide a switch API to process a plurality of microservices involved in a workflow and connected to a distributed in-memory keyvalue database, where the distributed in-memory keyvalue database further may include a plurality of key spaces, as described above.

As also shown in FIG. 4, process 400 may include managing configuration tools to track the latency of each microservice in the plurality of microservices (block 404).

For example, configuration tools may include Ansible, Chef, Telemetry, or other third-party tools. The processor may manage configuration tools to track the latency of each microservice in the plurality of microservices, as described above. As further shown in FIG. 4, process 400 may include programing data plane information of the microservices to create programmed data, where programming further may include collecting and analyzing data on the latency of each microservice of the plurality of microservices (block 406). For example, the processor may define their own data plane algorithms for network devices of the microservices to create programmed data, where programming further may include collecting and analyzing data on the latency of each microservice of the plurality of microservices, as described above. As also shown in FIG. 4, process 400 may include feeding the programmed data into an ASIC such as (block 408). For example, processor may feed the programmed data into an ASIC such as Broadcom, Strata DNX (Dune); Cisco, Silicon One; Innovium, or TeraLynx, as described above.

According to additional embodiments, process 400 may include additional implementations, such as any single implementation or any combination of implementations described below and/or in connection with one or more other processes described elsewhere herein. A first implementation, process 400 further includes subscribing to all key spaces that are used for communication to keep track of one or more events happening in the key spaces.

In a second implementation, alone or in combination with the first implementation, process 400 further includes capturing performance metrics of the plurality of microservices for any given workflow to create captured data, correlating the captured data to create correlated data; and providing an end-user a traceability matrix of latencies that correspond to the correlated data.

In a third implementation, alone or in combination with the first and second implementation, process 400 further includes monitoring communications between the microservices using a publisher-subscriber function available through the distributed in-memory key-value database.

In a fourth implementation, alone or in combination with one or more of the first through third implementations, process 400 may include executing a new micro service perform a targeted computation.

In a fifth implementation, alone or in combination with one or more of the first through fourth implementations, process 400 may include publishing required data in the distributed in-memory key-value database; and notifying the plurality of microservices that need to respond by terms of subscription to this channel-keyspace, where each input to the microservice will provide an output in the distributed in-memory key-value database that which can be consumed by other micro services.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. According to a further embodiment, a method is disclosed wherein a processor monitors the communication between the microservices using the publisher-subscriber function available through the database infrastructure. Whenever a micro service needs to be commissioned to perform some computations or solve problems, it is triggered by publishing the required data in the Microservices that need to respond to this information will be notified by terms of subscription to this channel-keyspace. Each input to the microservice will provide an output in the distributed in-memory key-value database—which can be consumed by other micro services.

FIG. 5 is a flowchart of an process 500 of measuring latency according to an embodiment of the present disclosure. In some implementations, one or more process blocks of FIG. 5 may be performed by a processor.

As shown in FIG. 5, process 500 may include subscribing to a plurality of key-spaces that are used for communication and track a plurality of events happening in these key-spaces (block 502). For example, processor may subscribe to a plurality of key-spaces that are used for communication and track a plurality of events happening in these key-spaces, as described above. As also shown in FIG. 5, process 500 may include accessing all interactions using a subscription provided to create built records, where the built records are built across different key-spaces along with a time taken for each operation (block 504). For example, processor may access all interactions using a subscription provided to create built records, where the built records are built across different key-spaces along with a time taken for each operation, as described above. As further shown in FIG. 5, process 500 may include correlates the built records against a type of workflow, where the type of workflow includes config management or event handling (block 506). For example, processor may correlates the built records against a type of workflow, where the type of workflow includes config management or event handling, as described above. As also shown in FIG. 5, process 500 may include provides a summary of all latencies across all services for a specific workflow (block 508). For example, processor may provides a summary of all latencies across all services for a specific workflow, as described above.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As it can be inferred from the above figures, various components interact with each other directly or indirectly in a microservice based architecture. It can be appreciated that any configuration or event occurring in the system needs to percolate across multiple microservices before resulting in an end-result.

Tracing these microservices creates immense value to understand system behavior under operating conditions. It can be appreciated that this provides many possibilities to study the system in detail, for example the above methods provide analytics pertaining to how much time the request was pending with each of the microservices.

The foregoing disclosure provides illustration and description but is not intended to be exhaustive or to limit the implementations to the precise form disclosed. Modifications may be made in light of the above disclosure or may be acquired from practice of the implementations. As used herein, the term "component" is intended to be broadly construed as hardware, firmware, or a combination of hardware and software. It will be apparent that systems and/or methods described herein may be implemented in different forms of hardware, firmware, and/or a combination of hardware and software.

The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein. As used herein, satisfying a threshold may depending on the context, refer to a value being greater than the threshold, greater than or equal to the threshold, less than the threshold, less than or equal to the threshold, equal to the threshold, and/or the like, depending on the context. Although particular combinations of features are recited in the claims and/or disclosed in the specification, these combinations are not intended to limit the disclosure of various implementations. In fact, many of these features may be combined in ways not specifically recited in the claims and/or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such. Also, as used herein, the articles "a" and "an" are intended to include one or more items and may be used interchangeably with "one or more."

Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for measuring latency across microservices comprising the steps of:
   providing a switch API to process a plurality of microservices involved in a workflow and connected to a distributed in-memory key-value database, wherein the distributed in-memory key-value database further comprises a plurality of key spaces;
   managing configuration tools to track the latency of each microservice in the plurality of microservices;
   programing data plane information of the microservices to create programmed data, wherein programming further comprises collecting and analyzing data on the latency of each microservice of the plurality of microservices; and
   feeding the programmed data into an ASIC.

2. The method of claim 1, further comprising: subscribing to all key spaces that are used for communication to keep track of one or more events happening in the key spaces.

3. The method of claim 2, further comprising: capturing performance metrics of the plurality of microservices for any given workflow to create captured data, correlating the captured data to create correlated data; and providing an end-user a traceability matrix of latencies that correspond to the correlated data.

4. The method of claim 3, further comprising: monitoring communications between the microservices using a publisher-subscriber function available through the distributed in-memory key-value database.

5. The method of claim 4, further comprising executing a new micro service perform a targeted computation.

6. The method of claim 5, further comprising publishing required data in the distributed in-memory key-value database; and
   notifying the plurality of microservices that need to respond by terms of subscription to a designated channel-keyspace, wherein each input to a microservice will provide an output in the distributed in-memory key-value database that which can be consumed by other micro services.

7. A system for measuring latency across microservices comprising:
   one or more processors configured to:
   provide a switch API to process a plurality of microservices involved in a workflow and connected to a distributed in-memory keyvalue database, wherein the distributed in-memory keyvalue database further comprises a plurality of key spaces;
   manage configuration tools to track the latency of each microservice in the plurality of microservices;
   program data plane information of the microservices to create programmed data, wherein programming further comprises collecting and analyzing data on the latency of each microservice of the plurality of microservices; and
   feed the programmed data into an ASIC.

8. The system of claim 7, wherein the one or more processors are further configured to:
   subscribe to all key spaces that are used for communication to keep track of one or more events happening in the key spaces.

9. The system of claim 8, wherein the one or more processors are further configured to:
   capture performance metrics of the plurality of microservices for any given workflow to create captured data, correlating the captured data to create correlated data; and
   provide an end-user a traceability matrix of latencies that correspond to the correlated data.

10. The system of claim 9, wherein the one or more processors are further configured to:
   monitor communications between the microservices using a publisher-subscriber function available through the distributed in-memory keyvalue database.

11. The system of claim 10, wherein the one or more processors are further configured to:
   execute a new micro service perform a targeted computation.

12. The system of claim 11, wherein the one or more processors are further configured to:
   publish required data in the distributed in-memory key-value database; and
   notify the plurality of microservices that need to respond by terms of subscription to a designated channel-keyspace, wherein each input to a microservice will provide an output in the distributed in-memory key-value database that which can be consumed by other micro services.

* * * * *